United States Patent
Morimoto et al.

(10) Patent No.: US 7,751,686 B2
(45) Date of Patent: Jul. 6, 2010

(54) DATA RECORDING APPARATUS, DATA REPRODUCING APPARATUS, DATA RECORDING METHOD, AND DATA REPRODUCING METHOD

(75) Inventors: Kenji Morimoto, Neyagawa (JP); Hirofumi Nakagaki, Kadoma (JP); Yoshiyasu Kuramoto, Katano (JP); Atsuo Ochi, Moriguchi (JP); Etsuto Nakatsu, Katano (JP)

(73) Assignee: Panasonic Corporation, Osaka (JP)

( * ) Notice: Subject to any disclaimer, the term of this patent is extended or adjusted under 35 U.S.C. 154(b) by 1925 days.

(21) Appl. No.: 10/088,037

(22) PCT Filed: Jul. 9, 2001

(86) PCT No.: PCT/JP01/05931

§ 371 (c)(1),
(2), (4) Date: Aug. 28, 2002

(87) PCT Pub. No.: WO02/05554

PCT Pub. Date: Jan. 17, 2002

(65) Prior Publication Data

US 2003/0039468 A1 Feb. 27, 2003

(30) Foreign Application Priority Data

Jul. 12, 2000 (JP) ............................ 2000-211138

(51) Int. Cl.
*H04N 5/783* (2006.01)
(52) U.S. Cl. ...................... 386/68; 386/81; 386/111; 386/46; 386/112; 386/109
(58) Field of Classification Search ............. 386/46, 386/112, 109, 111, 98, 81
See application file for complete search history.

(56) References Cited

U.S. PATENT DOCUMENTS 5,740,306 A * 4/1998 Shinohara et al. ............. 386/67

(Continued)

FOREIGN PATENT DOCUMENTS

JP 8-111068 4/1996

(Continued)

OTHER PUBLICATIONS

Japanese search report for PCT/JP01/05931 dated Nov. 6, 2001.

(Continued)

*Primary Examiner*—Thai Tran
*Assistant Examiner*—Helen Shibru
(74) *Attorney, Agent, or Firm*—RatnerPrestia

(57) ABSTRACT

In the case where rate information is not transmitted on an input bit stream, it was difficult to efficiently record the input bit stream in accordance with the rate of the input bit stream. Therefore, a data recording apparatus is realized which comprises: signal processing means of coding the input bit stream to a recording signal; a packet counter section that counts the number of packets serving as constituting units of the input bit stream, for a fixed time period; a system controller that controls a recording rate on a tape-like recording medium; and recording means of recording the recording signal on the tape-like recording medium, and which is configured so as to calculate the rate of the input bit stream from an output of the packet counter section to control the recording rate, whereby recording can be efficiently conducted in accordance with the rate of an input signal.

13 Claims, 11 Drawing Sheets

U.S. PATENT DOCUMENTS

| | | | | |
|---|---|---|---|---|
| 5,819,113 | A | * | 10/1998 | Singh et al. .................... 710/55 |
| 6,038,094 | A | * | 3/2000 | Matsumi et al. ............... 360/70 |
| 6,493,362 | B1 | * | 12/2002 | Inazumi ...................... 370/537 |
| 6,628,613 | B1 | * | 9/2003 | Joung et al. ................. 370/230 |
| 2004/0190857 | A1 | * | 9/2004 | Owashi et al. ................ 386/46 |
| 2005/0152686 | A1 | * | 7/2005 | Takashimizu et al. ....... 386/111 |

FOREIGN PATENT DOCUMENTS

| | | |
|---|---|---|
| JP | 8-147609 | 6/1996 |
| JP | 8-275109 | 10/1996 |
| JP | 8-339630 | 12/1996 |
| JP | 10-092106 | 4/1998 |
| JP | 11-234618 | 8/1999 |

OTHER PUBLICATIONS

English translation of Form PCT/ISA/210.

* cited by examiner

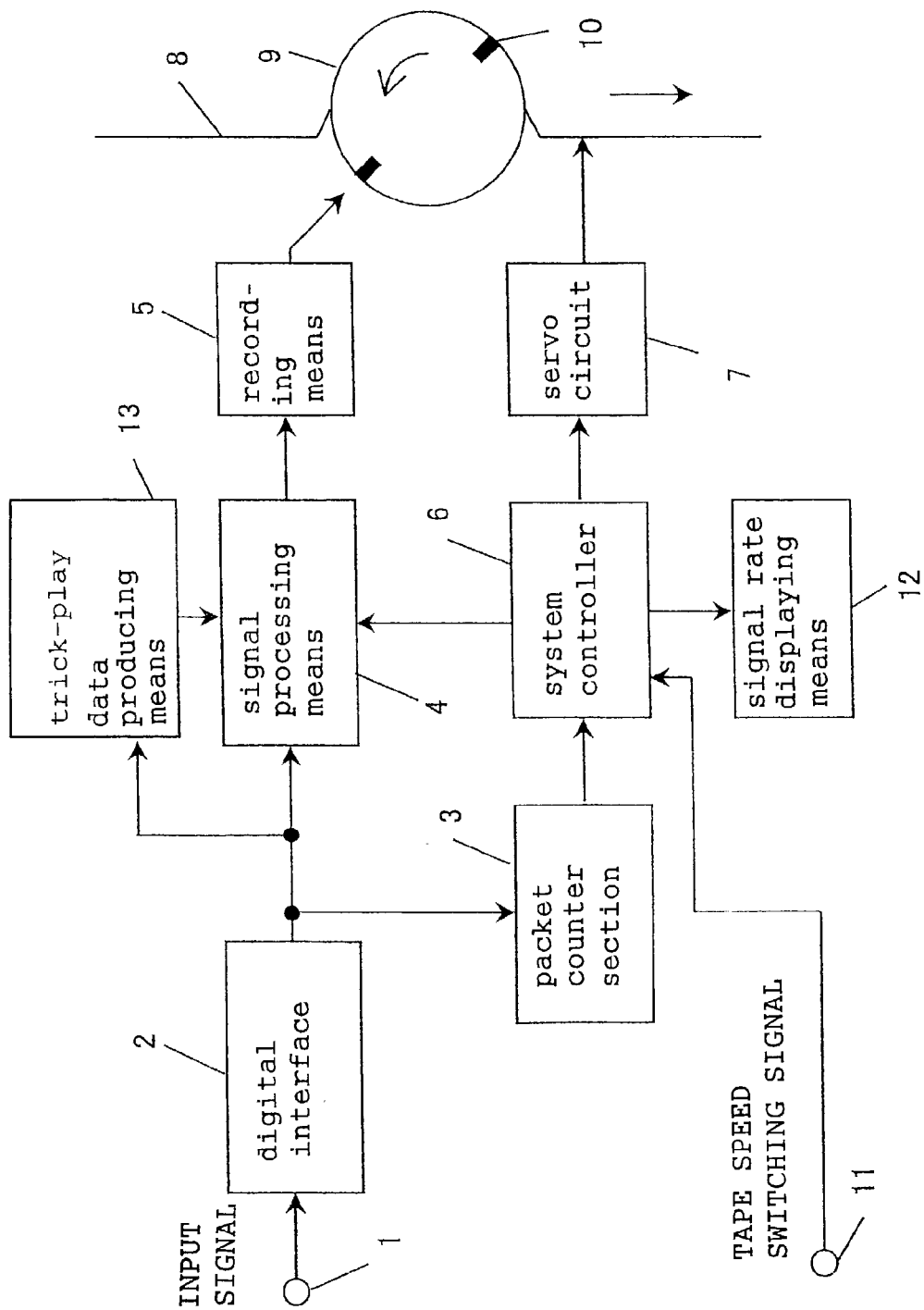

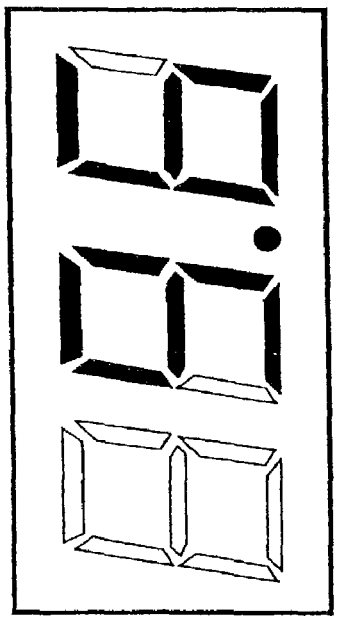
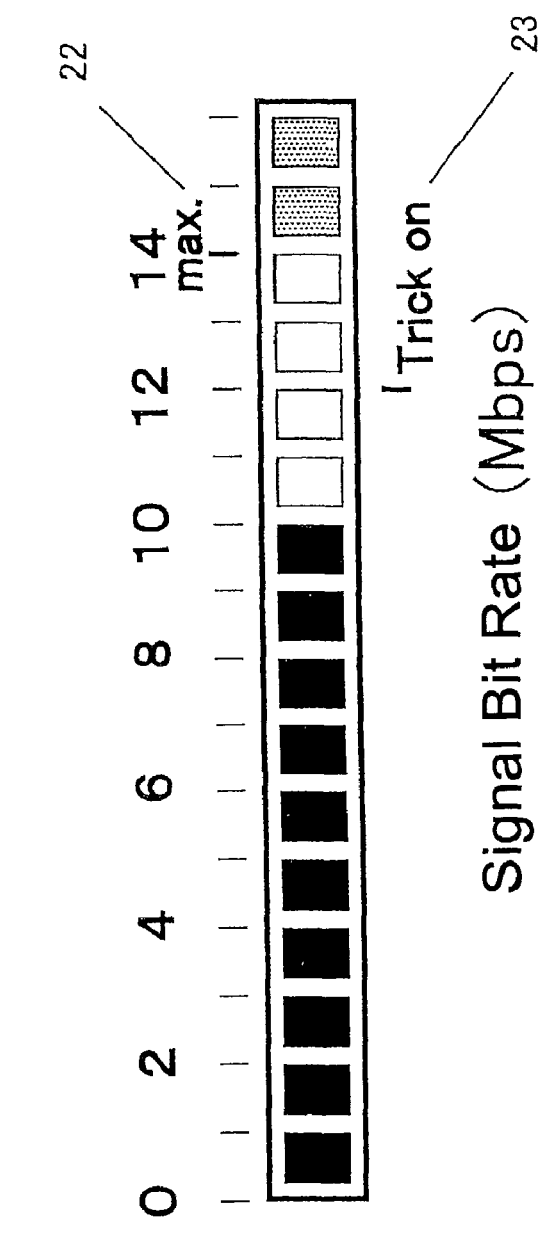
Fig. 6 (a)
Fig. 6 (b)

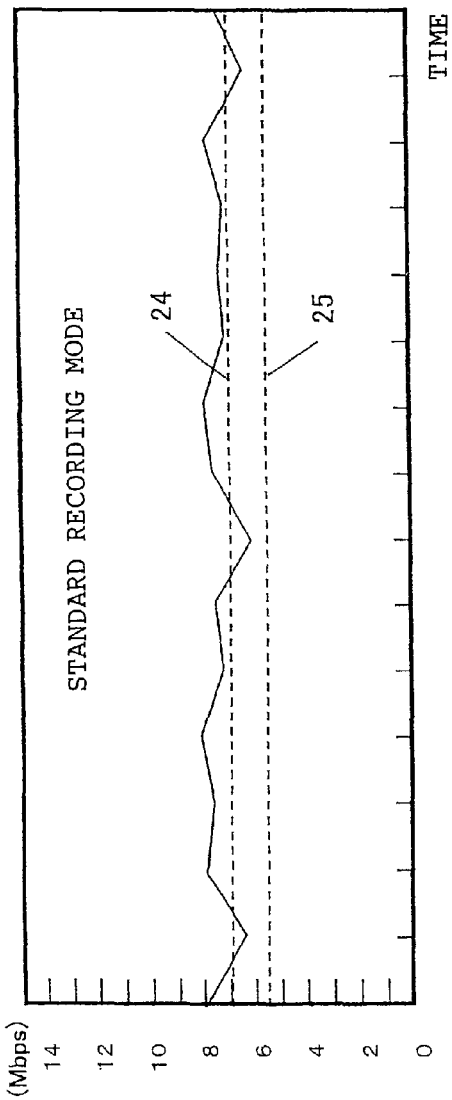

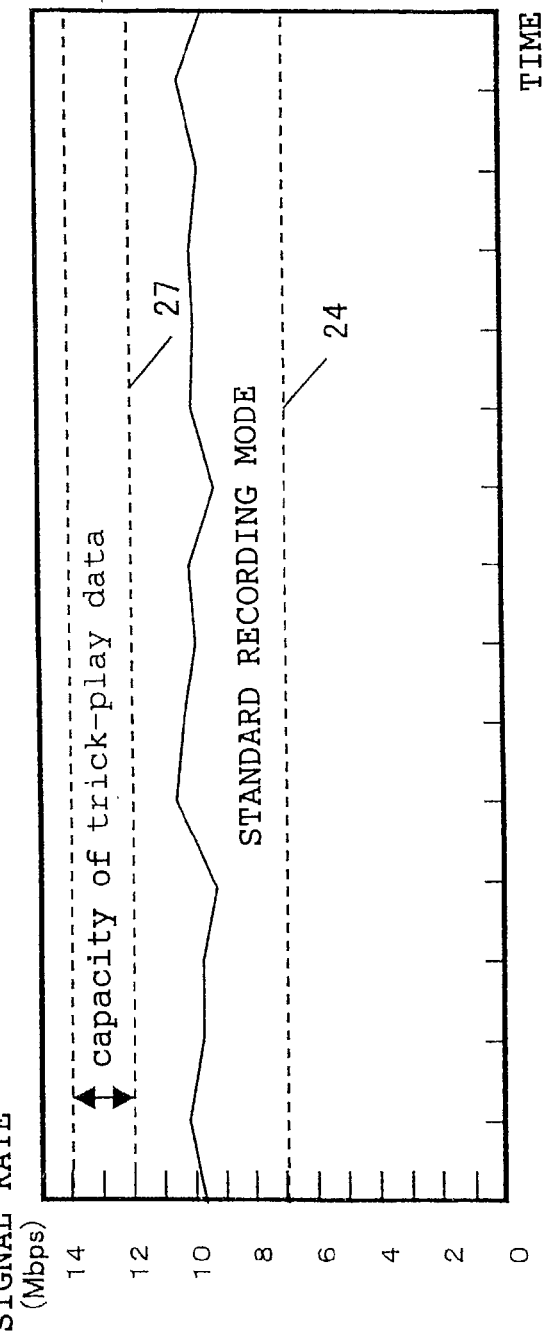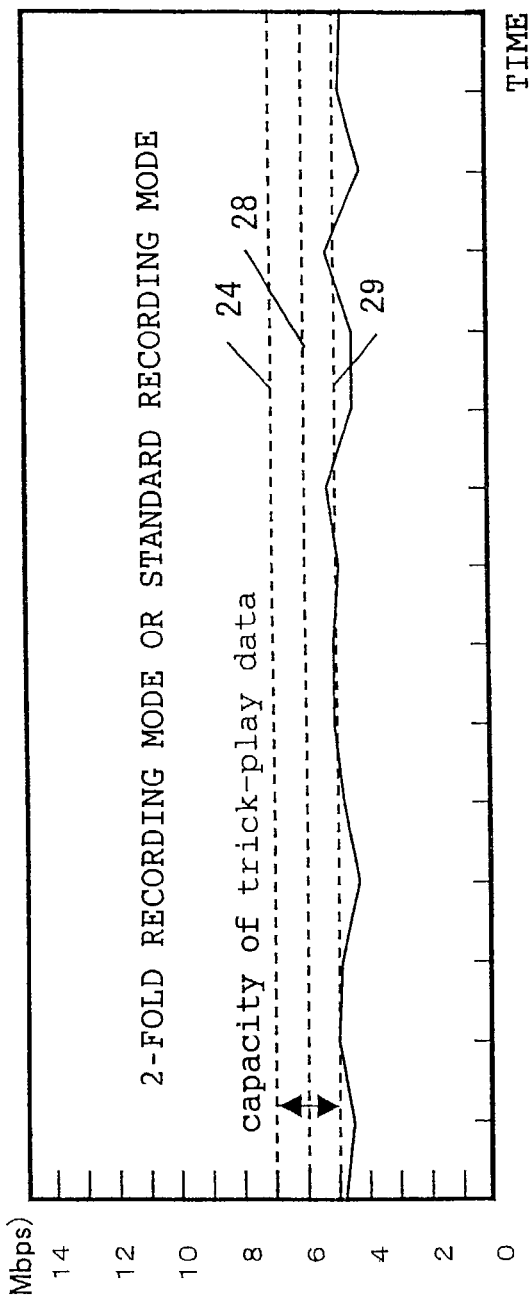

DATA RECORDING APPARATUS, DATA REPRODUCING APPARATUS, DATA RECORDING METHOD, AND DATA REPRODUCING METHOD

This application is a U.S. National Phase application of PCT International Application PCT/JP01/05931.

TECHNICAL FIELD

The present invention relates to a data recording apparatus and a data recording method which record information such as an image, a voice, or a data that is digitalized and than transmitted, and also to a data reproducing apparatus and a data reproducing method which reproduce recorded information.

BACKGROUND ART

Recently, several recording apparatuses which digitally record and reproduce digitalized video and audio signals have been put to practical use or proposed. Hereinafter, an example of such conventional digital recording apparatuses will be described with reference to the drawings.

FIG. 11 is a block diagram of a conventional digital recording apparatus. In FIG. 11, 1 denotes an input terminal, 40 denotes an error correcting encoder, and 41 denotes a modulator. The reference numeral 43 denotes a rate information extractor, 44 denotes a system controller, and 39 denotes a tape feed controller. The reference numeral 8 denotes a tape-like recording medium, and 42 denotes recording heads.

The operation of the thus configured digital recording apparatus will now be described.

A digital bit stream signal of an image, a voice, or a data is input through the input terminal 1. The error correcting encoder 40 adds an error correcting code which compensates a data error caused by record/reproduction, to the digital signal input through the input terminal 1, and converts the signal into a recording format for a recording apparatus to produce an original recording signal.

The rate information extractor 43 acquires data rate information from the input bit stream, and the system controller 44 changes the recording rate in accordance with the rate to control the error correcting encoder 40 and the tape feed controller 39. For example, the rate information is that which is described in an input bit stream by a broadcasting station or the like and then transmitted. For example, the maximum rate of the bit stream is described.

The modulator 41 applies modulation for recording on the recording signal which is produced by the error correcting encoder 40. The recording heads 42 record the modulated recording signal on the tape-like recording medium 8. In this way, the conventional digital recording apparatus is configured so as to extract rate information from an input bit stream and record the input bit stream in a preset recording mode. The above-mentioned digital recording apparatus is disclosed in, for example, Japanese Patent Publication (Kokai) No. HEI08111068. The entire disclosure of Japanese Patent Publication (Kokai) No. HEI08111068 is incorporated herein by reference in its entirety.

However, the above-mentioned configuration has problems in that, in a case such as that where the rate information is not added to the input bit stream, where the accuracy of the rate information is low, where the rate information is different from that related to a time period about which the recording apparatus wishes to know the rate, or where the input bit stream contains a plurality of streams, the recording mode cannot be determined or the input bit stream cannot be recorded in the preset recording mode because the recording data rate is not known or is incorrect, the data amount per record unit in the recording apparatus is not known, or the calculation of the total rate of the recording streams requires a long time period.

When the recording mode cannot be determined, even in the case where the rate of the input bit stream is large, data must be set so as to be recorded on the tape-like recording medium 8 without omission. As a result, the input bit stream is recorded on the tape-like recording medium 8 in a recording mode which corresponds to such a case of a large rate. Even in the case where the rate is small in practice, when the rate of the input bit stream is not known, therefore, the bit stream is recorded by using a recording mode for the case of a large rate, and hence the tape cannot be efficiently used.

DISCLOSURE OF INVENTION

In view of the above-mentioned problems, it is an object of the invention to provide a data recording apparatus and a data recording method in which the rate of an input bit stream is easily calculated, and the rate of recording the input bit stream on a recording medium is controlled by using the calculated rate, whereby the input bit stream can be efficiently recorded.

It is another object of the invention to provide a data recording apparatus and a data recording method which, even in the case where a special-reproduction data is to be recorded together with the input bit stream on a recording medium, can efficiently record the input bit stream.

It is a further object of the invention to provide a data recording apparatus and a data recording method in which the rate of an input bit stream is easily calculated, and the input bit stream can be efficiently recorded in a recording mode that is set by the user.

It is a still further object of the invention to provide a data recording apparatus and a data recording method which can record an input bit stream without frequently changing the recording mode.

It is a still further object of the invention to provide a data reproducing apparatus and a data reproducing method which reproduce a data recorded by the data recording apparatus or the data recording method of the invention.

One aspect of the present invention (corresponding to claim 1) is a data recording apparatus comprising:

inputting means of receiving a data;

data converting means of converting the data which is received by said inputting means, into a recording signal;

recording means of recording the recording signal which is converted by said data converting means, on a predetermined recording medium;

data rate detecting means of detecting a rate of the data which is received by said inputting means; and controlling means of controlling a recording rate of said recording means by using the rate which is detected by said data rate detecting means.

Another aspect of the present invention (corresponding to claim 2) is a data recording apparatus according to the 1st invention, wherein said apparatus further comprises special-data producing means of, from the data which is received by said inputting means, producing at least one or more kinds of special-reproduction data, said recording means records also the special-reproduction data which is produced by said special-data producing means, and said controlling means controls the recording rate in consideration of also an amount of the special-reproduction data which is produced by said special-data producing means.

Still another aspect of the present invention (corresponding to claim 3) is a data recording apparatus comprising:

inputting means of receiving a data;

data converting means of converting the data which is received by said inputting means, into a recording signal;

recording means of recording the recording signal which is converted by said data converting means, on a predetermined recording medium;

data rate detecting means of detecting a rate of the data which is received by said inputting means;

rate information outputting means of outputting information of the rate which is detected by said data rate detecting means; and controlling means of controlling a recording rate of said recording means on the basis of instructions from a user.

Yet still another aspect of the present invention is a data recording apparatus, wherein said apparatus further comprises special-data producing means of, from the data which is received by said inputting means, producing at least one or more kinds of special-reproduction data, said recording means records also the special-reproduction data which is produced by said special-data producing means, on said recording medium, and said rate information outputting means outputs also information of an amount of the special-reproduction data which is produced by said special-data producing means.

Still yet another aspect of the present invention is a data recording apparatus, wherein there are plural kinds of special-reproduction data, and said apparatus further comprises switching means of switching the kinds of special-reproduction data which are produced by said special-data producing means.

A further aspect of the present invention is a data recording apparatus, wherein the data which is received by said inputting means is a bit stream consisting of a packet signal string configured by a data of a fixed length, and said data rate detecting means counts a number of the packets constituting the bit stream at intervals of a predetermined fixed time period, thereby detecting the rate.

A still further aspect of the present invention is a data recording apparatus, wherein the bit stream is a bit stream configured by a transport packet of an MPEG system of MPEG2 or higher, or a bit stream of a DSS system.

A yet further aspect of the present invention is a data recording apparatus, wherein the fixed time period is a time corresponding to an integer multiple of a minimum record unit time of said data recording apparatus.

A still yet further aspect of the present invention is a data recording apparatus, wherein said controlling means compares a predetermined reference value with the rate which is detected by said data rate detecting means, to control the recording rate of said recording means.

An additional aspect of the present invention is a data recording apparatus, wherein the predetermined reference value is a value which is determined in accordance with a rate of a head data of the recording signal which is to be recorded by said recording means, in each recording time period.

A still yet additional aspect of the present invention is a data recording apparatus, wherein there are at least two kinds of recording modes in which said recording means records the recording signal, and at intervals of a predetermined time period, when a rate of a data corresponding to the recording signal which is to be recorded by said recording means exceeds even once the predetermined reference value, said controlling means controls the recording rate of said recording means so that all recording signals during the predetermined time period are recorded in a recording mode in which a data of a rate exceeding the predetermined reference value can be recorded.

A yet additional aspect of the present invention is a data recording apparatus, wherein there are at least two kinds of recording modes in which said recording means records the recording signal, and at intervals of a predetermined time period, until a rate of a data corresponding to the recording signal which is to be recorded by said recording means exceeds the predetermined reference value, said controlling means controls the recording rate of said recording means so that the recording signal is recorded in a recording mode corresponding to a rate which does not exceed the predetermined reference value, and, after the rate of the data corresponding to the recording signal which is to be recorded by said recording means exceeds the predetermined reference value, controls the recording rate of said recording means so that the recording signal is recorded in a recording mode corresponding to a higher rate which exceeds the predetermined reference value.

A still yet additional aspect of the present invention is a data recording apparatus, wherein the predetermined time period means a continuous recording time period, or a recording time period of bit streams of same contents.

A supplementary aspect of the present invention is a data recording apparatus comprising:

inputting means of receiving a data;

data converting means of converting the data which is received by said in putting means, into a recording signal;

recording means of recording the recording signal which is converted by said data converting means, on a predetermined recording medium; and controlling means of fixing a recording rate of said recording means to a predetermined rate in accordance with a broadcasting channel corresponding to the recording signal which is to be recorded by said recording means.

A still supplementary aspect of the present invention is a data recording apparatus, wherein the data which is received by said inputting means is a bit stream configured by a transport packet of an MPEG system of MPEG2 or higher, or a bit stream of a DSS system.

A yet supplementary aspect of the present invention is a data recording apparatus, wherein said recording means records also the recording rate on the recording medium.

A still yet supplementary aspect of the present invention is a data reproducing apparatus comprising at least reproducing means of, by using the recording rate which is recorded on the recording medium by a data recording apparatus, reproducing the recording signal which is recorded on the recording medium.

One aspect of the present invention is a data recording method comprising:

an inputting step of receiving a data;

a converting step of converting the data which is received in said inputting step, into a recording signal;

a recording step of recording the recording signal which is converted in said converting step, on a predetermined recording medium;

a rate detecting step of detecting a rate of the data which is received in said inputting step; and a controlling step of controlling a recording rate in said recording step by using the rate which is detected in said rate detecting step.

Another aspect of the present invention is a data recording method, wherein said method further comprises a special-data producing step of, from the data which is received in said inputting step, producing at least one or more kinds of special-reproduction data, in said recording step, also the special-reproduction data which is produced in said special-data producing step is recorded on said recording medium, and in said controlling step, the recording rate is controlled in consideration of also an amount of the special-reproduction data which is produced in said special-data producing step.

Still another aspect of the present invention is a data recording method comprising:

an inputting step of receiving a data;

a converting step of converting the data which is received in said inputting step, into a recording signal;

a recording step of recording the recording signal which is converted in said converting step, on a predetermined recording medium;

a rate detecting step of detecting a rate of the data which is received in said inputting step;

a rate information outputting step of outputting information of the rate which is detected in said rate detecting step; and a controlling step of controlling a recording rate in said recording step on the basis of instructions from a user.

Yet still another aspect of the present invention is a data recording method, wherein said method further comprises a special-data producing step of, from the data which is received in said inputting step, producing at least one or more kinds of special-reproduction data, in said recording step, also the special-reproduction data which is produced in said special-data producing step is recorded on said recording medium, and in said rate information outputting step, also information of an amount of the special-reproduction data which is produced in said special-data producing step is output.

Still yet another aspect of the present invention is a data recording method, wherein the data which is received in said inputting step is a bit stream consisting of a packet signal string configured by a data of a fixed length, and in said rate detecting step, the rate is detected by counting a number of the packets constituting the bit stream at intervals of a predetermined fixed time period.

A further aspect of the present invention is a data recording method comprising:

an inputting step of receiving a data;

a converting step of converting the data which is received in said inputting step, into a recording signal;

a recording step of recording the recording signal which is converted in said converting step, on a predetermined recording medium; and a controlling step of fixing a recording rate in said recording step to a predetermined rate in accordance with a broadcasting channel corresponding to the recording signal which is recorded in said recording step.

A still further aspect of the present invention is a data recording method, wherein the data which is received in said inputting step is a bit stream configured by a transport packet of an MPEG system of MPEG2 or higher, or a bit stream of a DSS system.

A yet further aspect of the present invention is a data recording method, wherein, in said recording step, also the recording rate is recorded on the recording medium.

A still yet further aspect of the present invention is a data reproducing method comprising at least a reproducing step of, by using the recording rate which is recorded on the recording medium by a data recording method, reproducing the recording signal which is recorded on the recording medium.

An additional aspect of the present invention is a program for causing a computer to function as a whole or a part of, in a data recording apparatus:

inputting means of receiving a data;

data converting means of converting the data which is received by said inputting means, into a recording signal;

recording means of recording the recording signal which is converted by said data converting means, on a predetermined recording medium;

data rate detecting means of detecting a rate of the data which is received by said inputting means; and controlling means of controlling a recording rate of said recording means by using the rate which is detected by said data rate detecting means.

A still additional aspect of the present invention is a program for causing a computer to function as a whole or a part of, in a data recording apparatus:

inputting means of receiving a data;

data converting means of converting the data which is received by said inputting means, into a recording signal;

recording means of recording the recording signal which is converted by said data converting means, on a predetermined recording medium;

data rate detecting means of detecting a rate of the data which is received by said inputting means;

rate information outputting means of, outputting information of the rate which is detected by said data rate detecting means; and controlling means of controlling a recording rate of said recording means on the basis of instructions from a user.

A yet additional aspect of the present invention is a program for causing a computer to function as a whole or a part of, in a data recording apparatus:

inputting means of receiving a data;

data converting means of converting the data which is received by said inputting means, into a recording signal;

recording means of recording the recording signal which is converted by said data converting means, on a predetermined recording medium; and controlling means of fixing a recording rate of said recording means to a predetermined rate in accordance with a broadcasting channel corresponding to the recording signal which is to be recorded by said recording means.

A still yet additional aspect of the present invention is a medium which carries a program for causing a computer to function as a whole or a part of, in a data recording apparatus:

inputting means of receiving a data;

data converting means of converting the data which is received by said inputting means, into a recording signal;

recording means of recording the recording signal which is converted by said data converting means, on a predetermined recording medium;

data rate detecting means of detecting a rate of the data which is received by said inputting means; and controlling means of controlling a recording rate of said recording means by using the rate which is detected by said data rate detecting means, said medium being processable by a computer.

A supplementary aspect of the present invention is a medium which carries a program for causing a computer to function as a whole or a part of, in a data recording apparatus:

inputting means of receiving a data;

data converting means of converting the data which is received by said inputting means, into a recording signal;

recording means of recording the recording signal which is converted by said data converting means, on a predetermined recording medium;

data rate detecting means of detecting a rate of the data which is received by said inputting means;

rate information outputting means of outputting information of the rate which is detected by said data rate detecting means; and controlling means of controlling a recording rate of said recording means on the basis of instructions from a user, said medium being processable by a computer.

A still supplementary aspect of the present invention is a medium which carries a program for causing a computer to function as a whole or a part of, in a data recording apparatus:

inputting means of receiving a data;

data converting means of converting the data which is received by said inputting means, into a recording signal;

recording means of recording the recording signal which is converted by said data converting means, on a predetermined recording medium; and controlling means of fixing a recording rate of said recording means to a predetermined rate in accordance with a broadcasting channel corresponding to the recording signal which is to be recorded by said recording means, said medium being processable by a computer.

BRIEF DESCRIPTION OF DRAWINGS

FIG. 4 is a block diagram of a data recording apparatus of Embodiment 4 of the invention.

FIG. 6 is a view showing an example of a signal rate displaying section in Embodiment 2 or 4 of the invention.

FIG. 8 is a view illustrating the input signal rate and the recording mode control system in Embodiments 1 to 4 of the invention.

FIG. 9 is a view illustrating the input signal rate and the recording mode control system in Embodiment 3 or 4 invention.

Figure 1:
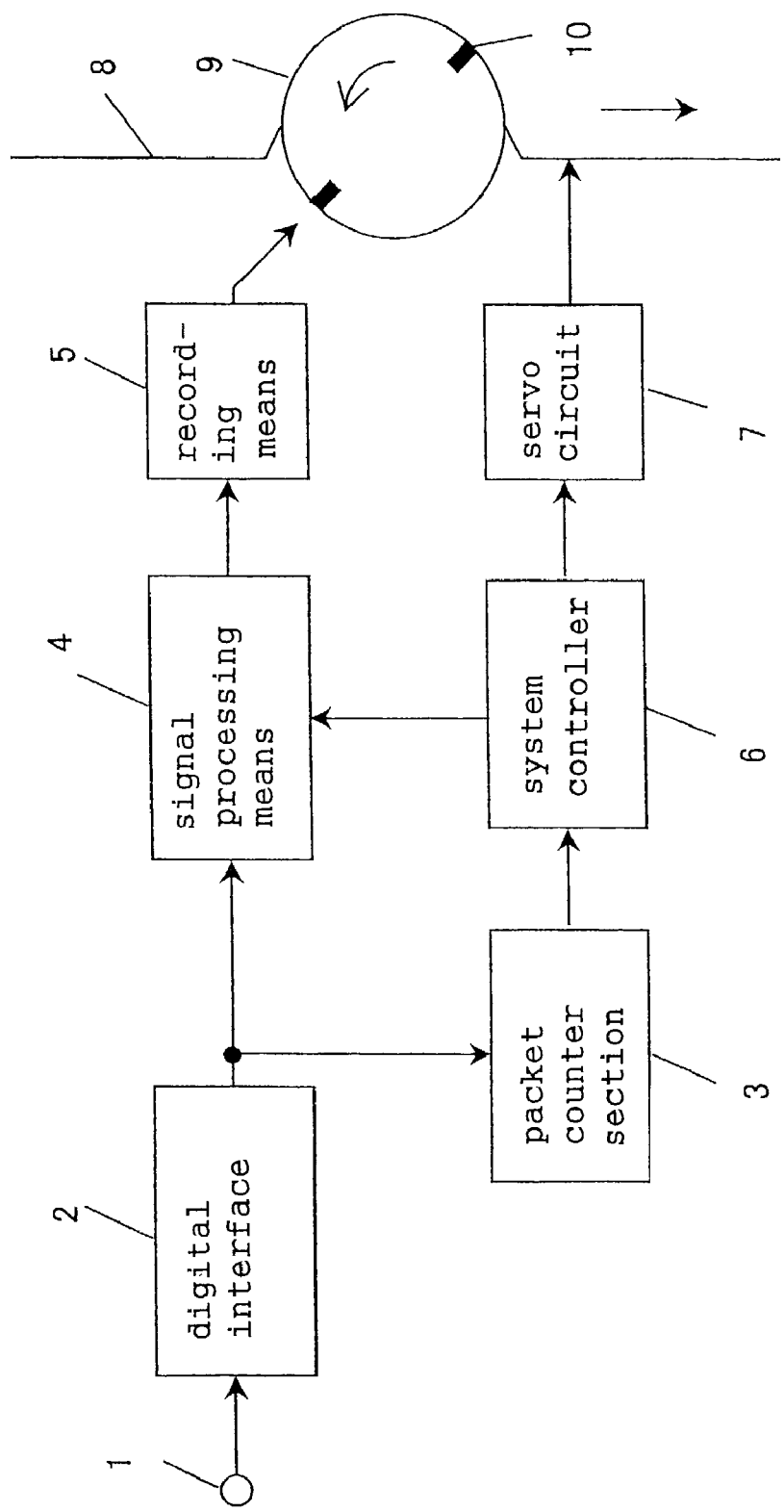
FIG. 1 is a block diagram of a data recording apparatus of Embodiment 1 of the invention.

DESCRIPTION OF THE REFERENCE NUMERALS AND SIGNS 1 input terminal
2 digital interface
3 packet counter section
4 signal processing means
5 recording means
6 system controller
7 servo circuit
8 tape-like recording medium
9 cylinder
10 recording head
11 tape speed switching signal input terminal
12 signal rate displaying means
13 trick-play data producing means
14 packet signal input terminal
15 track counter
16 packet counter
17 counter value holding circuit
18 recording mode determining means
19 recording mode signal output terminal
20 bit rate calculating circuit
21 bit rate value output terminal
22 display of maximum recording rate
23 display of maximum recording rate in recording of special-reproduction data
24 2-fold recording mode recordable rate
25 recording mode change rate
26 signal rate observing time period
27 standard-recording mode recordable rate in recording of special-reproduction data
28 2-fold recording mode recordable rate in recording of one kind of special-reproduction data
29 2-fold recording mode recordable rate in recording of two kinds of special-reproduction data
30 recording track
31 head locus in +8-fold speed special reproduction in standard recording mode
32 head locus in −8-fold speed special reproduction in standard recording mode
33 data for +8-fold speed special reproduction
34 data for −8-fold speed special reproduction
35 head locus in +16-fold speed special reproduction in standard recording mode
36 head locus in −16-fold speed special reproduction in standard recording mode
37 data for +16-fold speed special reproduction
38 data for −16-fold speed special reproduction
39 tape feed controller
40 error correcting encoder
41 modulator
42 recording head
43 rate information extractor
44 system controller Best Mode for Carrying Out the Invention Hereinafter, embodiments of the invention will be described with reference to FIGS. 1 to 10.

Embodiment 1

FIG. 1 is a block diagram of a data recording apparatus of Embodiment 1. In FIG. 1, an input terminal 1 is a terminal through which a bit stream signal of an image, a voice, or a that is to be recorded is input. The bit stream signal is input to a packet counter section 3 and signal processing means 4 through a digital interface 2. An output of the signal processing means 4 is recorded via recording means 5 on a tape-like recording medium 8 with forming tracks thereon by recording heads 10 disposed in a rotary cylinder 9.

The reference numeral 6 denotes a system controller which controls the signal processing means 4 and a servo circuit 7 in order to control the recording apparatus to a recording mode where a signal can be recorded most efficiently, in accordance with a packet counter value output from the packet counter section 3.

Hereinafter, the operation of the thus configured data recording apparatus will be described with reference to FIGS. 1 and 5 to 8.

Referring to FIG. 1, a recording bit stream is a data string in the unit of a fixed length packet such as an MPEG2 data. In MPEG2, a plurality of bit streams can be transmitted with being multiplexed in the unit of a packet. In the digital interface 2, it is possible also to select a packet to be recorded. A packet which is selected to be actually recorded is input to the packet counter section 3 and the signal processing means 4 through the digital interface 2.

The packet counter section 3 counts the number of packets in the input bit stream at intervals of a predetermined time period. The predetermined time period is set to a record unit which depends on the format of the recording apparatus, or, in this example, one recording track interval recorded on the tape-like recording medium 8. The number of packets can be counted during the time period of the record unit which depends on the format of the recording apparatus. The packets are of the fixed length type. When the number of packets in a predetermined time period such as the record unit which depends on the format of the recording apparatus is once known, therefore, it is convenient for the conversion to the recording rate in the record unit in the recording apparatus. In the above example, the record unit which depends on the format of the recording apparatus is set to one recording track interval formed on the tape-like recording medium 8. Alternatively, the record unit may be set to two recording track intervals.

The signal processing means 4 adds an error correcting code to the input bit stream, and converts the resulting bit stream into the format of the recording apparatus to produce the recording signal. Thereafter, modulation for recording is applied on the recording signal by the recording means 5. The recording signal is then amplified to an adequate recording signal by a recording amplifier or the like, and recorded by the recording heads 10 disposed in the rotary cylinder 9 on the tape-like recording medium 8 controlled by the servo circuit 7, with forming recording tracks thereon.

Meanwhile, the data recording apparatus has a plurality of recording modes. In the recording modes, recording is enabled at different recording rates, and the tape feed speed is changed in accordance with the recording mode. Namely, in a mode where recording is enabled at a higher recording rate, the tape feed is fastened, or a larger number of the recording heads 10 are used. By contrast, in a mode where recording is conducted at a lower recording rate, the tape feed is controlled so as to be slow, the number of the used recording heads 10 is reduced, or the recording operation is intermittently conducted, whereby the tape-like recording medium 8 can be used more efficiently.

For example, an apparatus in which the recording mode is switched over between the standard recording mode and the 2-fold recording mode will be considered. In the 2-fold recording mode, one track is recorded during a 2-track time period in the standard recording mode, and the tape feed speed is controlled so as to be one half of that in the standard recording mode, whereby the twice recording time period can be realized by using a recording medium of the same capacity although the recording rate is one half of that of the standard recording mode.

On the basis of the packet number output from the packet counter section 3, the system controller 6 adaptively controls the recording mode of the data recording apparatus so that recording is conducted in the most efficient recording mode in which recording is enabled.

Figure 5A:
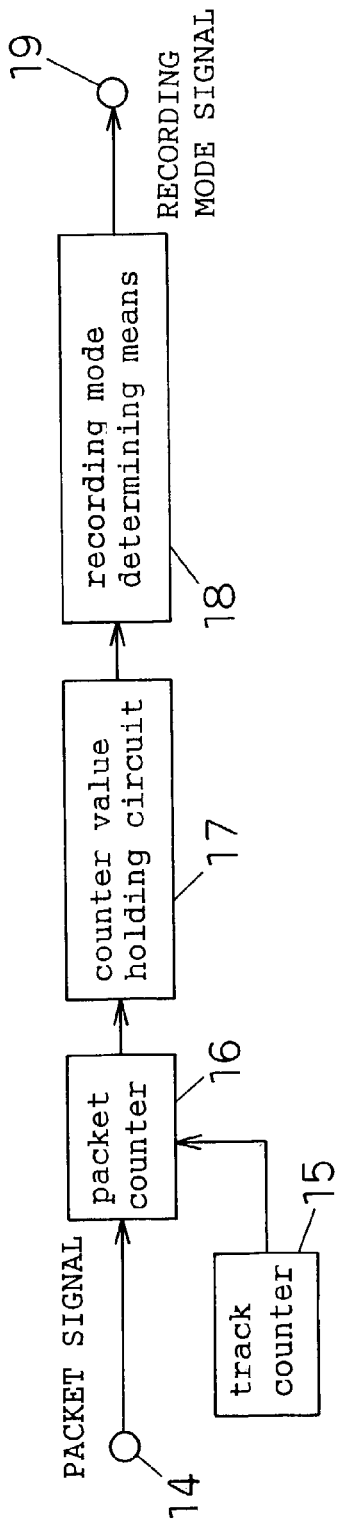
FIG. 5(a) is a block diagram of a packet counter section and a system controller section in Embodiment 1 or 3 of the invention.

FIG. 5(a) is a block diagram showing the operation of the packet counter section 3 and the system controller 6. The reference numeral 14 denotes a packet input terminal through which a packet to be recorded or a signal indicative an input of a packet is input to a packet counter 16. A track counter 15 generates a track reset pulse at intervals of the track interval which is the record unit of the data recording apparatus. For each track reset pulse generated by the track counter 15, the counter value of the packet counter 16 is reset to count the number of packets during the recording track interval which is the record unit of the data recording apparatus. The packet counter value for each track unit is held by a counter value holding circuit 17 during one track interval.

In accordance with an output of the counter value holding circuit 17, the recording mode of the data recording apparatus is adaptively determined by recording mode determining means 18, and output as a recording mode signal from a recording mode signal output terminal 19.

An example of the method of determining the recording mode will be described with reference to FIGS. 7 and 8. It is assumed that the data recording apparatus of Embodiment 1 is a data recording apparatus in which recording is enabled at a signal rate of 14 Mbps in the standard recording mode, and at a signal rate of 7 Mbps in the 2-fold recording mode. As described above, the 2-fold mode is a mode in which the recordable rate is one half of that in the standard recording mode, and the speed of the tape-like recording medium is controlled to be half, whereby recording for a time period which is twice that in the standard recording mode is enabled by using a recording medium of the same length.

Figure 7A:
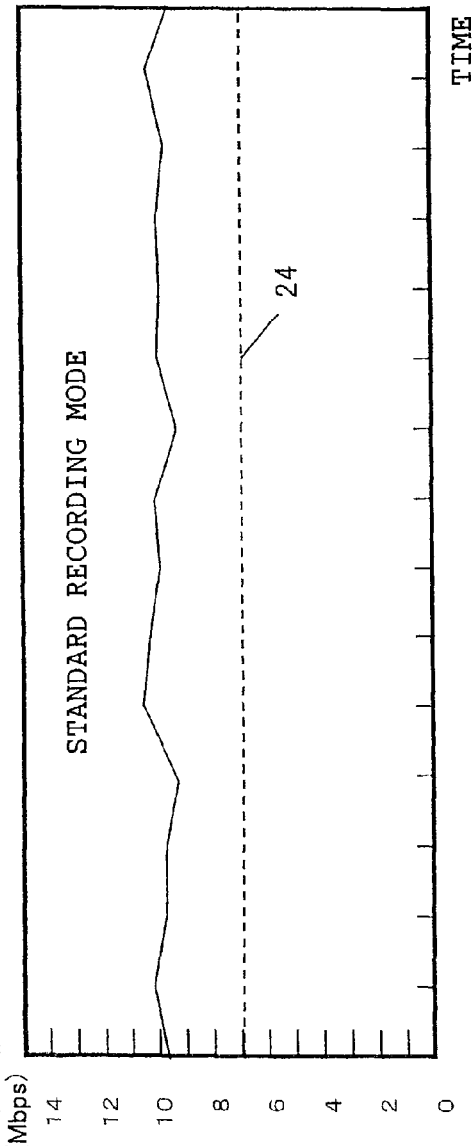
FIG. 7 is a view illustrating an input signal rate and a recording mode control system in Embodiments 1 to 4 of the invention.
Figure 7B:
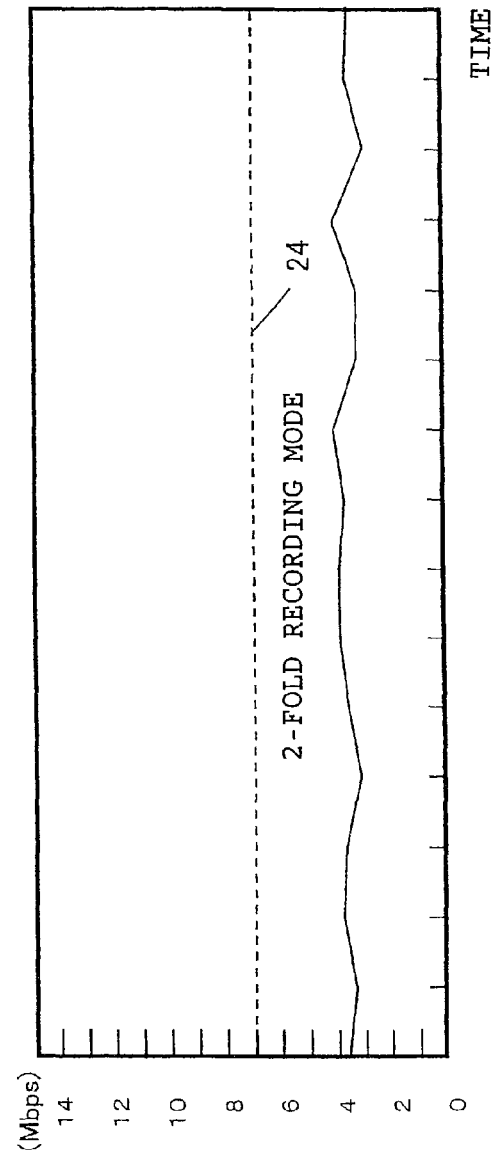

In the case where, as shown in FIG. 7(a), recording packets are always input at a packet count value which is larger than the broken line 24 indicating 7 Mbps, i.e., recording packets are input at a rate larger than 7 Mbps, the apparatus can be controlled so as to conduct recording in the standard mode. In the case where, as shown in FIG. 7(b), recording packets are always input at a packet count value which is smaller than the broken line 24 indicating 7 Mbps, i.e., recording packets are input at a rate smaller than 7 Mbps, the apparatus can be controlled so as to conduct recording in the 2-fold mode.

In the case where, as shown in FIGS. 8(a) and (b), the rate of input packets fluctuates in the vicinity of 7 Mbps which is the boundary of the two recording modes, several judging methods can be performed for setting the recording mode.

For example, as shown in FIG. 8(a), a rate value which is smaller than the broken line 24 indicative of the boundary of the recording modes is set as indicated by the broken line 25 to a provisional recording mode switching value. In the system of (a), in the case where recording packets are input at a rate larger than the switching value, the standard mode is set, and, in the case where recording packets are input at a rate smaller than the switching value 25, the apparatus is controlled so as to conduct record in the 2-fold mode. The switching value 25 may be fixedly set to a value which is somewhat smaller than 24.

In the case where it is previously known that, in a bit stream broadcasting channel to be recorded, bit streams are broadcast at a packet count value of 6 to 8 Mbps, the switching value 25 may be set to 5.5 Mbps. As a result, the recording mode is always set to the standard mode, and hence the recording mode is prevented from being frequently switched over.

With respect to a leading predetermined time period (e.g., 1 second) of a bit stream to be recorded, the packet count value (recording rate) of the bit stream may be checked. In the case where the checked packet count value (recording rate) is 6 to 8 Mbps, for example, the switching value 25 may be set to 5.5 Mbps after the leading predetermined time period of the bit stream has elapsed. Then, it is seemed that the possibility of frequently switching the recording mode is reduced after the switching value 25 is set to 5.5 Mbps.

In the method shown in FIG. 8(b), during a fixed time period 26 (e.g., 10 seconds), the signal rate obtained from the packet count value is kept to be compared with 7 Mbps which is the boundary of the recording modes. For each fixed time period 26, when the packet count value (recording rate) counted during the fixed time period 26 exceeds even once the value (7 Mbps) of the broken line 24 which serves as the reference, the apparatus is controlled so that the whole data of the fixed time period 26 are recorded in a recording mode where data of the portion of the exceeding packet count value can be recorded, i.e., the standard mode. As a result, the recording mode is not switched over during each fixed time period 26.

Alternatively, the apparatus maybe controlled so that, for each fixed time period 26, a data is recorded in the 2-fold mode until the packet count value (recording rate) exceeds the value (7 Mbps) of the broken line 24 which serves as the reference, and a data is recorded in the standard mode after the packet count value exceeds the value (7 Mbps) of the broken line 24 which serves as the reference. As a result, the recording mode is not frequently switched over during each fixed time period 26.

The fixed time period 26 maybe, for example, 10 seconds as described above, or may extend over the whole of the bit stream to be recorded.

As described above, various controlling methods may be employed. When the recording mode is switched over, a situation may be sometimes caused where the recording operation becomes discontinuous and, when the recorded data is reproduced from the tape-like recording medium, the reproduced data is interrupted. Therefore, it is preferable not to switch over the recording mode during the recording operation as far as possible. When the apparatus is once controlled so as to conduct recording in the standard recording mode, therefore, the apparatus is preferably controlled so as not to switch over the recording mode to the 2-fold mode in which the rate is lower, during a certain constant period such as a period when one recording stream is recorded, or that until the recording stream is switched over halfway. The period when one recording stream is recorded means a period from the start of recording of a bit stream to the end of the recording, or a recording time period when bit streams of the same contents such as the same program are recorded.

Namely, as described with reference to FIGS. 8(a) and (b), even in the case where an inputting operation is performed at a signal rate in the vicinity 24 of the boundary where the recording mode is switched over and the recording mode is frequently switched over as a result of simply controlling the recording mode in accordance with the level comparison between the signal rate and the recording mode boundary, a situation where the recordable capacity becomes insufficient and the recording is disabled can be prevented from occurring in the middle of the recording, by controlling the recording so that the recording rate is fixed to a higher one (in this example, the standard recording mode).

The recording mode is determined by the method described above, and the recording modes of the signal processing means 4 and the servo circuit 7 are controlled by the recording mode signal output from the recording mode signal output terminal 19.

In the embodiment, several examples have been described as the method of adaptively controlling the switch over of the recording rate in the system controller 6. The switch over of the recording rate may be controlled by a method other than the above-described examples.

Alternatively, a data to be recorded maybe temporarily stored in a memory, and the increase or decrease of the data stored in the memory may be detected to determine the recording mode (recording rate). However, the recording mode (recording rate) can be determined more easily by detecting the number of packets constituting a data (bit stream) to be recorded at intervals of a predetermined unit time period as in the above-described embodiment, because the packet number can be easily counted. Furthermore, the packet number for each record unit time period which depends on the format of the recording apparatus can be known. Consequently, there is a further merit that, when the packet number is compared with, for example, the number of packets which are recordable in one track, the packet number can be easily used in the control for data recording.

Embodiment 2

Figure 2:
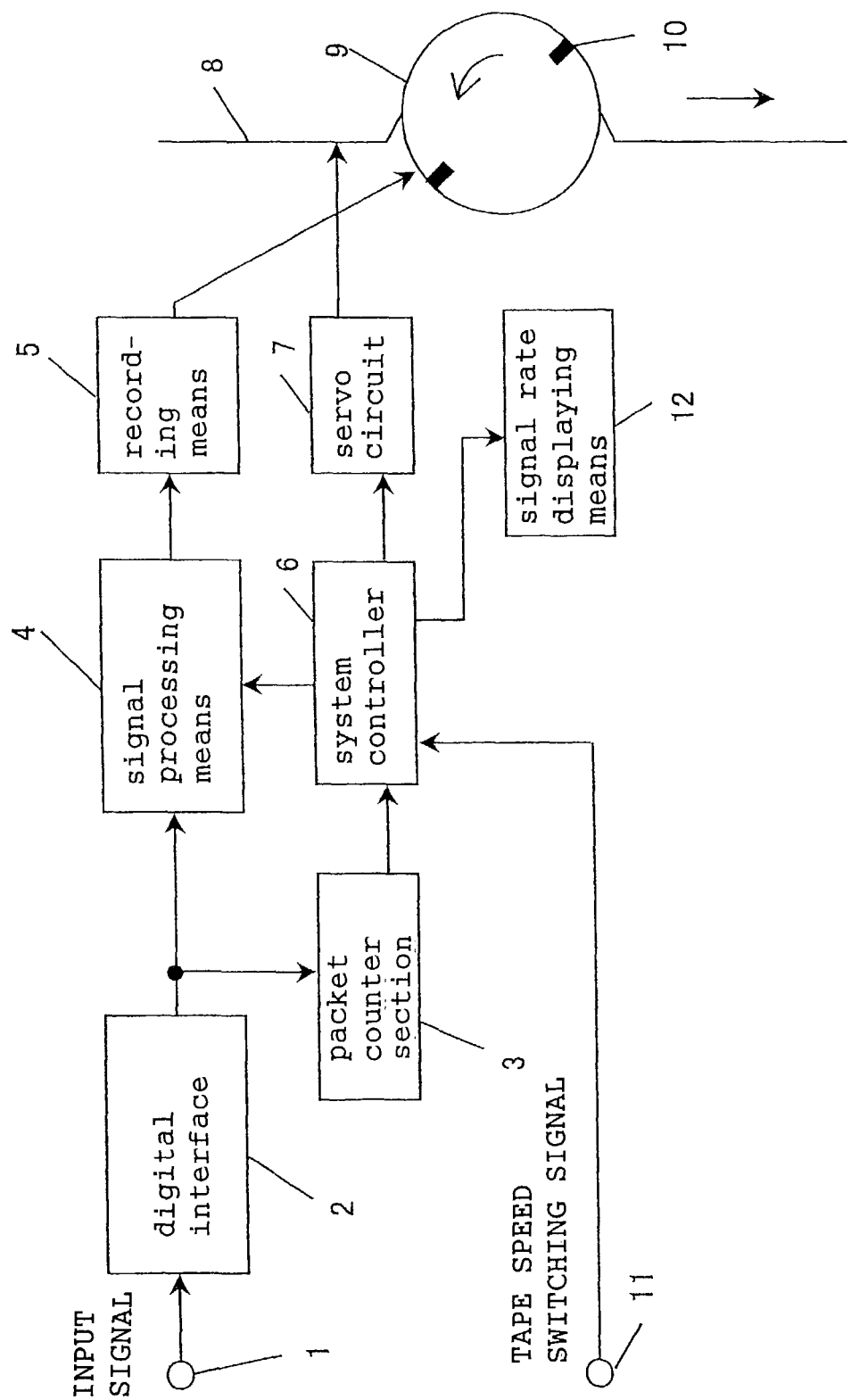
FIG. 2 is a block diagram of a data recording apparatus of Embodiment 2 of the invention.

Embodiment 2 has a configuration which is substantially common to that of Embodiment 1, and which is different only in that the embodiment has means for enabling the user to set the recording rate. FIG. 2 is a block diagram of Embodiment 2.

In FIG. 2, although description of portions common to those of Embodiment 1 is omitted, 11 denotes a tape speed switching signal input terminal, and 12 denotes signal rate displaying means.

Referring to FIG. 2, in the same manner as Embodiment 1, the packet signal input through the input signal 1 is converted into the recording signal and then recorded. Embodiment 2 is different from Embodiment 1 in that the rate of the input signal is displayed in the signal rate displaying means 12, and the user can freely set the recording rate.

Figure 5B:
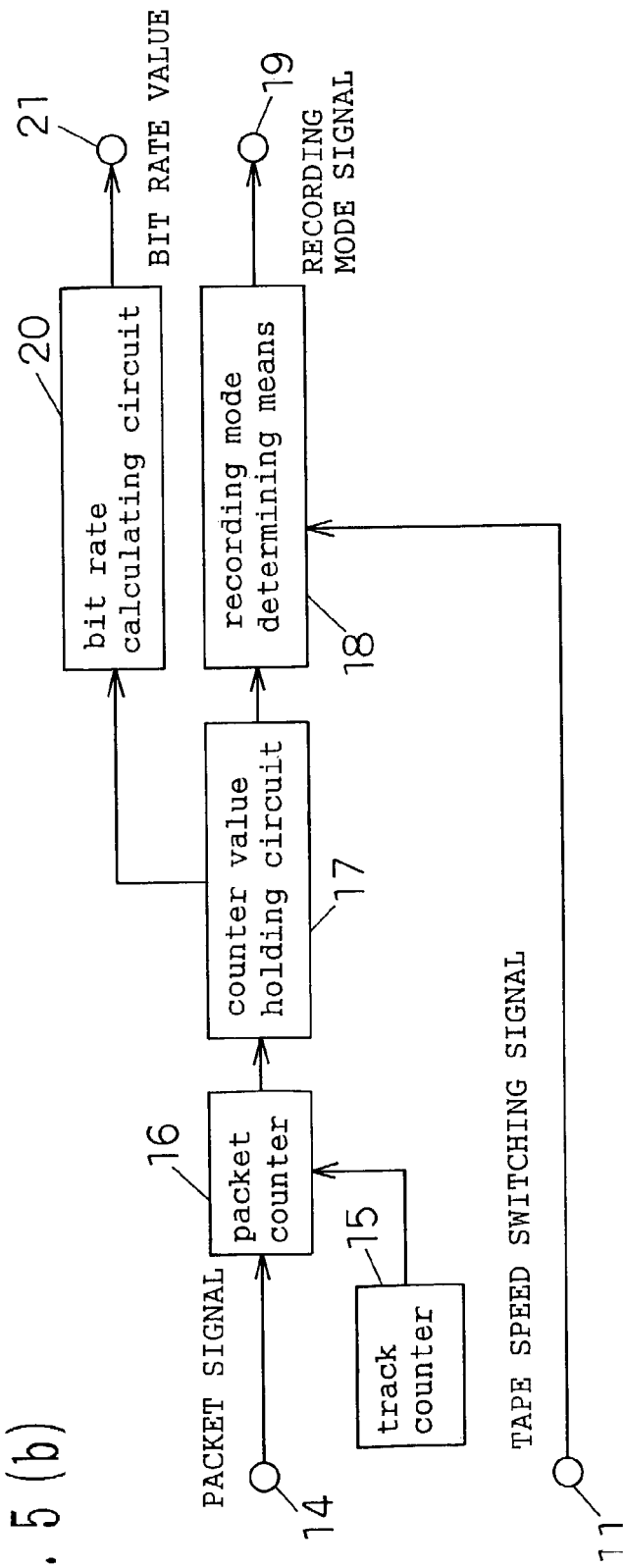
FIG. 5(b) is a block diagram of a packet counter section and a system controller section having a tape speed switching signal input terminal in Embodiment 2 or 4 of the invention.

FIG. 5(b) is a block diagram showing the operation of the packet counter section 3 and the system controller 6 having the tape speed switching signal input terminal 11. In FIG. 5(b), 14 denotes a packet input terminal through which a packet to be recorded, an enable indicative of an input of a packet, or a pulse signal indicating the start of a packet is input to the packet counter 16. The reference numeral 15 denotes a track counter, 16 denotes a packet counter, and 17 denotes a counter value holding circuit. The number of packets for one track interval is held by the counter value holding circuit 17 by the operation which is strictly identical with that of Embodiment 1.

An output of the counter value holding circuit 17 is input to a bit rate calculating circuit 20, a signal indicating the value of the bit rate is output from a bit rate value output terminal 21, and the bit rate is displayed by the signal rate displaying means 12.

The bit rate calculating circuit 20 calculates the bit rate of input packets from the packet number. When the output of the counter value holding circuit 17 is N (packets), the time period for one track is a time T (seconds) and the data amount per packet is D (bytes), for example, the recording rate R (bps) is calculated by an expression indicated by (Ex. 1) below:

$$R = (D \times 8 \times N)/T \quad \text{(Ex. 1)}.$$

The packet length is previously determined as a fixed length, for example, 188 bytes in the case of MPEG2. In place of the strict calculation according to (Ex. 1), therefore, the packet number may be easily converted into to an approximate rate value by using a simple conversion table or the like.

The thus converted recording rate is displayed by a bit rate displaying device such as shown in FIGS. 6(*a*) and (*b*). FIG. 6(*a*) shows an example in which the input rate is digitally displayed, and FIG. 6(*b*) shows an example in which the rate is displayed in the form of a graph as in the case of a level meter. As indicated by 22 in FIG. 6(*b*), the maximum rate which is recordable in the current recording mode may be displayed to enable the user to easily determine the change of the recording mode.

The recording mode determining means 18 determines the recording mode on the basis of a tape speed switching signal which is set by the user, and outputs the signal from the recording mode signal output terminal 19. The recording mode may be determined by: a method in which the switching operation is conducted with giving the highest priority to the setting by the user; or a method in which, in the case where a packet count value indicating a signal rate exceeding the setting by the user is input from the counter value holding circuit 17, a control of automatically switching to the standard mode by a method such as described in Embodiment 1 even when recording in the 2-fold mode is set by the user is added or the controlling method is selectively switched over.

Embodiment 3

Figure 3:
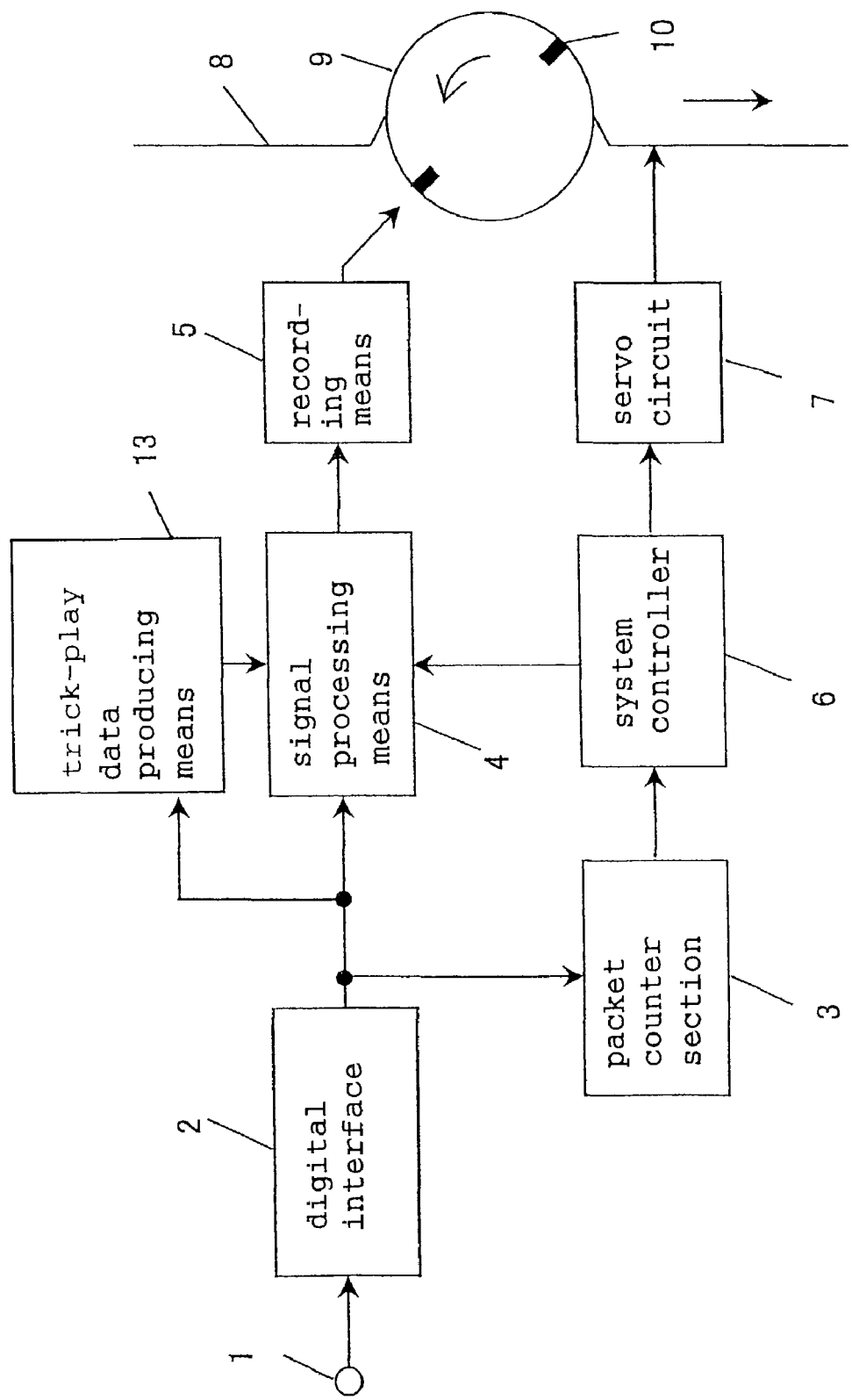
FIG. 3 is a block diagram of a data recording apparatus of Embodiment 3 of the invention.

Embodiment 3 has a configuration which is common in many points to that of Embodiment 1, and which is different only in that the data recording apparatus has means for separately producing and recording a special-reproduction data which is used in reproduction. FIG. 3 is a block diagram of Embodiment 3.

In FIG. 3, although description of portions common to those of Embodiment 1 is omitted, 13 denotes trick-play (special-reproduction) data producing means. In a data recording/reproducing apparatus in which recording/reproduction is conducted on the tape-like recording medium 8 by the heads 10 attached to the rotary cylinder 9, in the case where so-called fast forward/reverse special reproduction in which the tape is fed at a speed higher than that in the normal reproduction to obtain a reproduced image is to be performed, it is required to, during a recording process, previously produce a data for special reproduction in a dedicated manner and record the data at a specific position of the tape-like recording medium 8.

The trick-play data producing means 13 produces the special-reproduction data, and converts the data into a recording format, and the signal processing means 4 then converts the signal into a recording signal simultaneously with a usual recording data. In a data recording apparatus which records MPEG2 packets, a framed at a which is restorable from only a data of one frame, such as the I frame (intraframe) in the MPEG2 system, a data in which high-frequency coefficients of I frame are deleted, or the like is used as a special-reproduction data. Such data are previously recorded at positions over which the heads pass during a special reproduction process.

Figure 10:
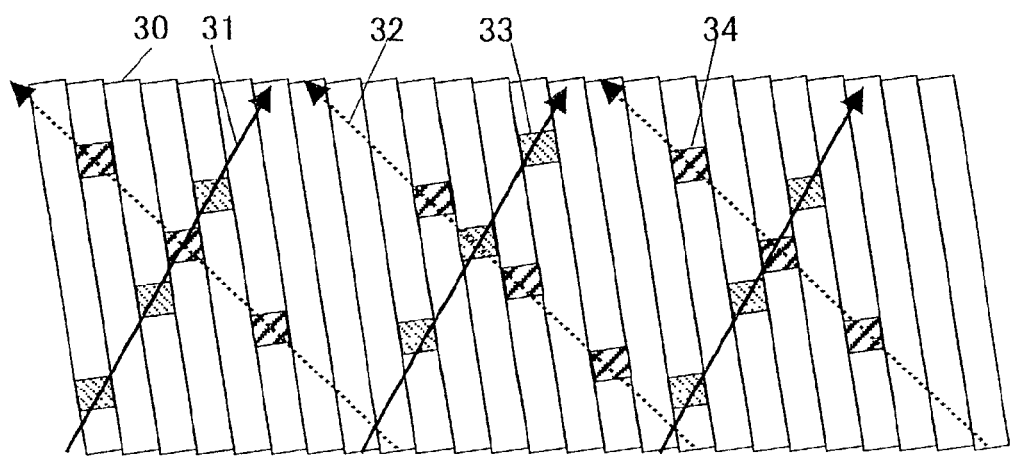
FIG. 10(a) is a view of an example of arrangement of of special-reproduction data in Embodiment 3 or 4 invention.
FIG. 10(b) is a view of an example of arrangement of of special-reproduction data in Embodiment 3 or 4 invention.
Figure 10:
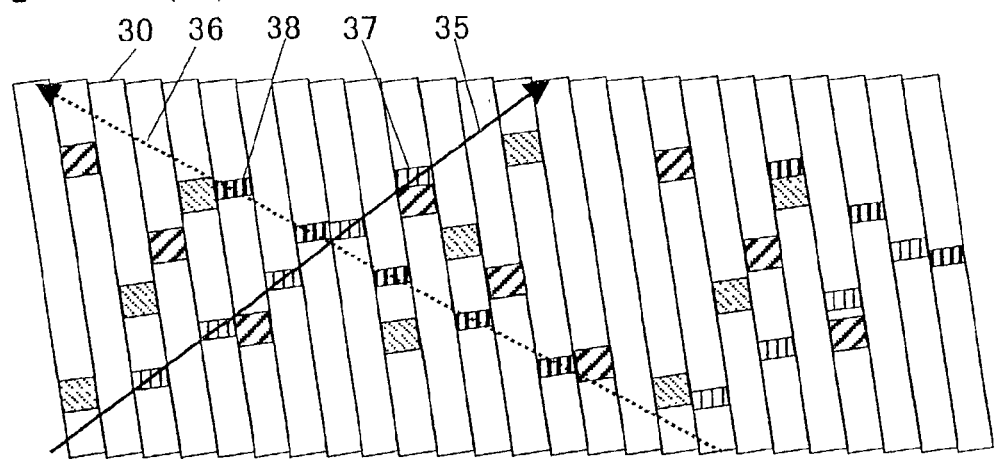
Figure 11:
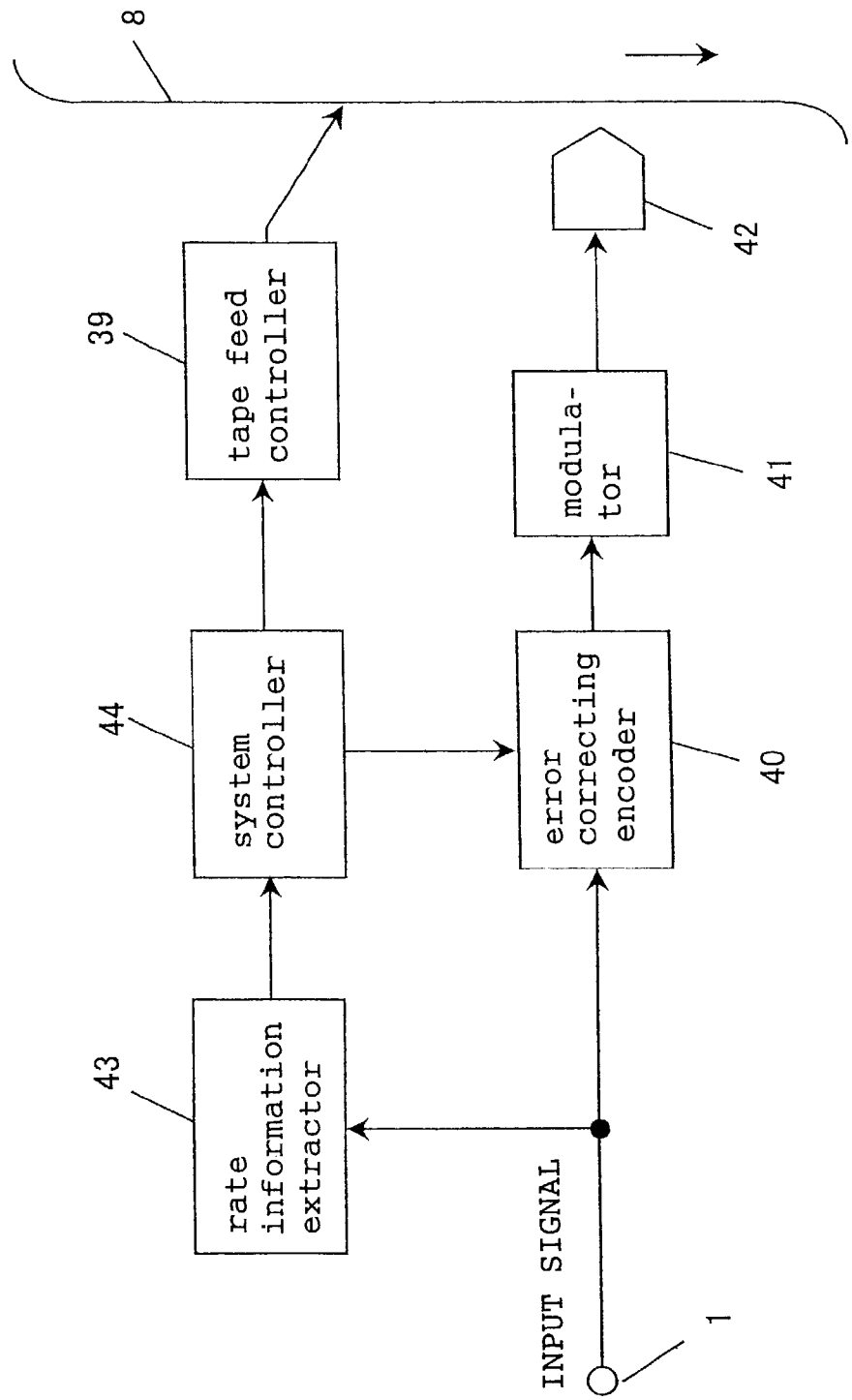
FIG. 11 is a block diagram of a conventional digital recording apparatus.

FIGS. 10(*a*) and (*b*) show arrangement examples of special-reproduction data. FIG. 10(*a*) shows an example of recording arrangement of data for ±8-fold speed special reproduction in the standard recording mode. The reference numeral 30 denotes recording tracks, 31 denotes loci along which the heads pass in +8-fold speed, 32 denotes loci along which the heads pass in −8-fold speed, 33 denotes data for +8-fold speed special reproduction, and 34 denotes data for −8-fold speed special reproduction.

FIG. 10(*b*) shows an example of recording arrangement corresponding to ±16-fold speed special reproduction in addition to the above-mentioned ±8-fold speed. In the example of FIG. 10(*b*), also data for ±16-fold speed special reproduction are simultaneously recorded in addition to the data for ±8-fold speed special reproduction shown in (*a*). In FIG. 10(*b*), 35 denotes loci along which the heads pass in +16-fold speed, 36 denotes loci along which the heads pass in −16-fold speed, 37 denotes data for +16-fold speed special reproduction, and 38 denotes data for −16-fold speed special reproduction.

When special-reproduction data dedicated to each fold speed are previously recorded as described above, a special-reproduction image can be obtained by reproducing the special-reproduction data dedicated to each fold speed during a special reproduction process. In the 2-fold mode, tracks are recorded while spending a time period which is twice that of the standard mode. Namely, in the 2-fold mode, one track is recorded for a time period corresponding to 2 tracks in the standard mode. When data arrangement is conducted in a substantially same manner as the standard mode, therefore, the arrangement of FIG. 10(*a*) becomes the data arrangement for ±16-fold speed special reproduction in the 2-fold mode, and the arrangement of FIG. 10(*b*) becomes that for ±32-fold speed special reproduction.

Since such special-reproduction data are recorded in specific positions in tracks for usual reproduction data, the capacity and recording rate of usual reproduction data which are recordable in the case where the configuration corresponds to special reproduction are reduced. In the case where recording is to correspond to special reproduction, therefore, the recording mode must be determined in consideration of the amount of such special-reproduction data.

FIGS. 9(*a*) and (*b*) show examples of the method of switchingly controlling the recording mode in Embodiment 3. In FIG. 9(*a*), 24 denotes the maximum recording rate in the 2-fold recording mode, 7 Mbps in this example, and 27 denotes the maximum recording rate of usual-reproduction data in the standard recording mode in the case where the mode corresponds to special reproduction, 12 Mbps in this example. Namely, as indicated by the arrow in the figure, the recordable usual recording data rate is reduced by a degree corresponding to the capacity of special-reproduction data. In consideration of the above, the recording mode, or allowance of recording must be judged. In FIG. 9(*a*), the signal rate reduced from the packet counter is always between 7 Mbps and 12 Mbps, and therefor it is possible to judge that recording can be conducted in the standard recording mode.

In FIG. 9(*b*), 28 denotes the usual recording rate in the 2-fold recording mode in the case where the mode corresponds to ±16-fold speed special reproduction as shown in FIG. 10(*a*), i.e., 6 Mbps, and 29 denotes the usual recording rate in the 2-fold recording mode in the case where the mode corresponds to two kinds of or ±16-fold and ±32-fold speed special reproductions as shown in FIG. 10(*b*) i.e., 5 Mbps. In this way, when data for special reproduction are recorded in a larger amount, the usual recording rate is further reduced.

In the case where, in FIG. 9(*b*), the signal rate reduced from the packet counter exceeds the recording rate of 29 but does not exceed that of 28, the control may be performed so that only one kind of special-reproduction data, or ±16-fold is recorded instead of both the two kinds of special-reproduction data. As a result, recording can be conducted in the 2-fold recording which has the recording rate of 28, or the usual recording rate of 6 Mbps in this example.

As described above, the apparatus can be controlled so as to record the input signal rate more efficiently, also by performing a control in which the kinds of special-reproduction data are reduced or recorded/unrecorded.

Embodiment 4

Embodiment 4 has a configuration which is common in many points to that of Embodiment 3, and which is different only in that the embodiment has means for enabling the user to set the recording rate in the same manner as the difference between Embodiments 1 and 2. FIG. 4 is a block diagram of Embodiment 4.

In FIG. 4, although description of portions common to those of Embodiment 3 is omitted, 11 denotes a tape speed switching signal input terminal, and 12 denotes signal rate displaying means.

Namely, according to Embodiment 4, the user can designate the recording rate in Embodiment 3, as in Embodiment 2. At this time, FIGS. 6(a) and (b) show the examples of the signal rate displaying means 12, and, as indicated by 23 in FIG. 6(b), a marker showing the recordable maximum rate which is changed in accordance with ON/OFF of recording of special reproduction, the number of special-reproduction data, and the like is displayed to assist the user to judge the setting of the recording mode.

Namely, the recording mode can be set in accordance with the capacity of special-reproduction data. In the system controller 6, the recording can be controlled so as to be conducted in the recording mode set by the user, by a control such as ON/OFF of recording of special-reproduction data or increase/decrease of the number of kinds such as that described in Embodiment 3.

Alternatively, also ON/OFF of recording of special-reproduction data and increase/decrease of the number of kinds of special-reproduction data may be allowed to be arbitrarily set by the user, so that the user can freely determine the recording mode with respect to the input signal rate by switching ON/OFF of recording of special-reproduction data, or switching recording of one kind of ±18-fold/recording or two kinds of ±18-fold and ±16-fold.

In the data recording apparatuses of Embodiments 1 to 4, when a data is recorded on the tape-like recording medium 8, also information indicating the recording mode in which the data is recorded, or the recording rate at which the data is recorded is recorded on the tape-like recording medium 8, because, when the recording mode or the recording rate is recorded on the tape-like recording medium 8 in this way, the tape reproduction can be conducted by using it. Also a data reproducing apparatus which comprises reproducing means of reproducing a data recorded on the tape-like recording medium 8 by using such a recorded mode or a recording rate recorded on the tape-like recording medium 8 belongs to the invention.

In all of Embodiments 1 to 4, a data recording apparatus has been described. Alternatively, a data recording/reproducing apparatus which has also a reproducing function may be configured.

In all of Embodiments 1 to 4, a data recording apparatus has been described in which the recording signal is recorded on the tape-like recording medium 8 with forming tracks thereon by the recording heads 10 disposed in the rotating rotary cylinder 9. The recording medium and the recording mechanism are not particularly restricted. For example, the apparatus may be configured as a digital recording apparatus which is a recording apparatus that uses a disk-like recording medium, and that has a plurality of recording modes, and in which the mode is switchedly set in accordance with the rate of an input signal.

Although the case where a transport stream of MPEG2 is recorded has been described in Embodiments 1 to 4, even a transport, stream of the MPEG system of MPEG2 or higher, such as MPEG4 can be similarly recorded. Also a bit stream of the DSS (Digital Satellite System) system of the U.S.A. can be similarly recorded.

The case where a transport stream of MPEG2 is recorded has been described with respect to Embodiments 1 to 4. Even in a digital recording apparatus into which a bit stream signal consisting of packet units of different lengths is input, the recording rate may be controlled in the same manner as Embodiments 1 to 4 by adapting the signal rate per packet.

As described above, the data recording apparatus of the embodiment has an advantage that the disposition of means of counting the number of packets of a fixed length constituting an input signal for a fixed time period enables the recording mode of the data recording apparatus to be arbitrarily controlled adaptively or by the user setting, so that efficient recording can be conducted.

Moreover, the invention provides a program which causes a computer to perform operations of a whole or a part of functions of the means of the above-described data recording apparatus of the invention, and which cooperates with the computer.

Moreover, the invention provides a medium which carries a program for causing a computer to realize a whole or a part of functions of a whole or a part of the means of the above-described data recording apparatus of the invention, the medium being computer-readable, the read program cooperating with the computer to realize the functions.

The part of the means in the invention implies several of the plural means, or a part of functions in one means.

Also a recording medium on which the program of the invention is recorded, and which is readable by a computer is included with the scope of the invention.

One of forms of using the program of the invention may be a mode in which the program is recorded on a computer-readable recording medium, and cooperates with a computer.

One of forms of using the program of the invention may be a mode in which the program is transmitted through a transmission medium to be read by a computer, and cooperates with the computer.

The recording medium includes a ROM and the like, and the transmission medium includes transmission media such as the Internet, and light, a radio wave, a sound wave, etc.

The above-mentioned computer of the invention is not restricted to pure hardware such as a CPU, and may include firmware, an OS, and peripheral equipment.

As described above, the configuration of the invention may be realized by means of software or hardware.

INDUSTRIAL APPLICABILITY

As apparent from the above description, the invention can provide a data recording apparatus and a data recording method in which the rate of an input bit stream is easily calculated, and the rate of recording the input bit stream on a recording medium is controlled by using the calculated rate, whereby the input bit stream can be efficiently recorded.

Furthermore, the invention can provide a data recording apparatus and a data recording method in which, even in the case where a special-reproduction data is to be recorded together with the input bit stream on a recording medium, the input bit stream can be efficiently recorded.

Furthermore, the invention can provide a data recording apparatus and a data recording method in which the rate of an input bit stream is easily calculated, and the input bit stream can be efficiently recorded in a recording mode that is set by the user.

Furthermore, the invention can provide a data recording apparatus and a data recording method which can record an input bit stream without frequently changing the recording mode.

Furthermore, it is possible to provide a data reproducing apparatus and a data reproducing method which reproduce a data recorded by the data recording apparatus or the data recording method of the invention.

The invention claimed is:

1. A data recording apparatus comprising:
an inputting device for receiving a bit stream consisting of a packet signal string configured by data of a fixed length;
a data converting device for converting the data which is received by said inputting device, into a recording signal;
a recording device for recording the recording signal which is converted by said data converting device, on a predetermined recording medium;
a data rate detecting device for detecting a data rate of the received bit stream by counting a number of packets received by said inputting device at intervals of a predetermined time period, the predetermined time period being a time period taken by said recording device to record data on said predetermined recording medium in a predetermined format; and
a controlling device for controlling a recording rate of said recording device based on the detected data rate,
wherein said controlling device compares a predetermined reference value with the data rate which is detected by said data rate detecting device, to control the recording rate of said recording device, and
wherein there are at least two kinds of recording modes in which said recording device records the recording signal, and
at intervals of a predetermined time period, until a rate of a data corresponding to the recording signal which is to be recorded by said recording device exceeds the predetermined reference value, said controlling device controls the recording rate of said recording device so that the recording signal is recorded in a recording mode corresponding to a rate which does not exceed the predetermined reference value, and, after the rate of the data corresponding to the recording signal which is to be recorded by said recording device exceeds the predetermined reference value, controls the recording rate of said recording device so that the recording signal is recorded in a recording mode corresponding to a higher rate which exceeds the predetermined reference value.

2. A data recording apparatus according to claim 1, wherein said apparatus further comprises a special-data producing device for, from the data which is received by said inputting device, producing at least one or more kinds of special-reproduction data,
said recording device records also the special-reproduction data which is produced by said special-data producing device, and
said controlling device controls the recording rate in consideration of also an amount of the special-reproduction data which is produced by said special-data producing device.

3. A data recording apparatus according to claim 2, wherein there are plural kinds of special-reproduction data, and said apparatus further comprises a switching device for switching the kinds of special-reproduction data which are produced by said special-data producing device.

4. A data recording apparatus according to claim 3, wherein the bit stream is a bit stream configured by a transport packet of an MPEG system of MPEG2 or higher, or a bit stream of a DSS system.

5. A data recording apparatus according to claim 1, wherein the predetermined reference value is a value which is determined in accordance with a rate of a head data of the recording signal which is to be recorded by said recording device, in each recording time period.

6. A data recording apparatus according to claim 1, wherein
at intervals of a predetermined time period, when a rate of a data corresponding to the recording signal which is to be recorded by said recording device exceeds even once the predetermined reference value, said controlling device controls the recording rate of said recording device so that all recording signals during the predetermined time period are recorded in a recording mode in which a data of a rate exceeding the predetermined reference value can be recorded.

7. A data recording apparatus according to claim 1, wherein the predetermined time period means a continuous recording time period, or a recording time period of bit streams of same contents.

8. A data recording apparatus according to claim 1, wherein said recording device records also the recording rate on said recording medium.

9. A data reproducing apparatus comprising at least a reproducing device for, by using the recording rate which is recorded on said recording medium by a data recording apparatus according to claim 8, reproducing the recording signal which is recorded on said recording medium.

10. A data recording method comprising:
an inputting step of receiving a bit stream consisting of a packet signal string configured by data of a fixed length;
a converting step of converting the data which is received in said inputting step, into a recording signal;
a recording step of recording the recording signal which is converted in said converting step, on a predetermined recording medium;
a data rate detecting step of detecting a data rate of the received bit stream by counting a number of packets received in said inputting step at intervals of a predetermined time period, the predetermined time period being a time period taken in said recording step to record data on said predetermined recording medium in a predetermined format; and
a controlling step of controlling a recording rate in said recording step based on the detected data rate,
wherein, in said controlling step, a predetermined reference value is compared with the data rate which is detected in said data rate detecting step, to control the recording rate in said recording step, and
wherein there are at least two kinds of recording modes in which the recording signal is recorded in said recording step, and
at intervals of a predetermined time period, until a rate of a data corresponding to the recording signal which is to be recorded in said recording step exceeds the predetermined reference value, in said controlling step, the recording rate in said recording step is controlled so that the recording signal is recorded in a recording mode corresponding to a rate which does not exceed the predetermined reference value, and, after the rate of the data corresponding to the recording signal which is to be recorded in said recording step exceeds the predetermined reference value, the recording rate in said recording step is controlled so that the recording signal is recorded in a recording mode corresponding to a higher rate which exceeds the predetermined reference value.

11. A data recording method according to claim 10, wherein said method further comprises a special-data producing step of, from the data which is received in said inputting step, producing at least one or more kinds of special-reproduction data, in said recording step, also the special-reproduction data which is produced in said special-data producing step is recorded on said recording medium, and in said controlling step, the recording rate is controlled in consideration of also an amount of the special-reproduction data which is produced in said special-data producing step.

12. A data recording method according to claim 10, wherein, in said recording step, also the recording rate is recorded on said recording medium.

13. A data reproducing method comprising at least a reproducing step of, by using the recording rate which is recorded on said recording medium by a data recording method according to claim 12, reproducing the recording signal which is recorded on said recording medium.

* * * * *